United States Patent
Fritts

(10) Patent No.: US 6,711,347 B1
(45) Date of Patent: Mar. 23, 2004

(54) SLIDE COPPER SYSTEM

(76) Inventor: Robert W. Fritts, 1575 N. Second St., Stillwater, MN (US) 55082

(*) Notice: Subject to any disclaimer, the term of this patent is extended or adjusted under 35 U.S.C. 154(b) by 0 days.

(21) Appl. No.: 10/303,148

(22) Filed: Nov. 25, 2002

(51) Int. Cl.[7] .............................................. G03B 17/02

(52) U.S. Cl. ......................... 396/4; 396/428; 396/544; 348/110

(58) Field of Search ................................. 396/4, 5, 419, 396/428, 544; 348/61, 96, 110, 373

(56) References Cited

U.S. PATENT DOCUMENTS

| | | | | | |
|---|---|---|---|---|---|
| 4,239,376 A | * | 12/1980 | Wyller | ......................... | 355/27 |
| 5,218,403 A | * | 6/1993 | Smith | ........................... | 355/39 |
| 5,253,069 A | * | 10/1993 | Zeyer | ........................... | 348/110 |
| 6,419,367 B1 | * | 7/2002 | Dion et al. | ................. | 359/612 |

* cited by examiner

Primary Examiner—David M. Cray

(57) ABSTRACT

Sunlight is reflected from the white surfaces of a diffuser chamber through a photographic slide in order to permit its being copied by a camera. The quality of color rendition is excellent, and the device is simpler and less expensive than alternative methods of reproduction. The device is supplied in kit form with parts that are assembled in a range of spacings to match lens heights of most cameras.

15 Claims, 5 Drawing Sheets

SLIDE COPPER SYSTEM

BACKGROUND OF THE INVENTION

This invention relates to a device and method for illuminating photographic color slide images that are to be photographed by a digital camera or film camera for duplication. Although much of the description of the invention relates to the use of digital cameras for providing graphic inputs to computer processing, the invention is equally applicable to the use of film cameras for duplicating photographic slides. Accordingly, as used herein, such terms as "copy," "copied," "copying," "copier," etc., refer to either or both types of photography. The device preferably uses sunlight as the source of illumination for true daylight color balance.

With the advent of digital photography and computer manipulation of digital imagery, several types of scanning systems have evolved to convert film-based photographic images to digital formats. Most common is the flat bed color scanner in which photo prints and other flat art are illuminated by artificial light and scanned rectilinearly by light reflected therefrom. Photographic slides are likewise scanned rectilinearly using transmitted light from an artificial internal lamp.

Scanners of these two types are costly, time-consuming to use, and do not deliver precise sunlight type color balance because of the artificial lamping used. The resultant computer-printed color images must be color-adjusted to approach the desired color realism. Digital cameras can be used to record all types of flat art for computer inputs. Daylight color balance can be achieved by placing the flat art in a sunlit position for photographing. Color transparencies, 35 mm slides in particular, can be copied by placing them on a light source several times brighter than the customary slide viewers in use today. The bright backlighting enables the digital camera in macro mode to auto-expose and auto-focus on the image within the slide. To avoid image blurring, the backlit slide and the camera must be rigidly connected mechanically to prevent relative movement therebetween during shutter manipulation by hand.

One digital camera manufacturer, Nikon, provides as an accessory to one specific camera model, the Nikon "Coolpix", a cylindrical hood that mounts onto the lens ring of the camera, having a circular diffuse transmitting front face behind which 35 mm slides can be passed through in a slidable rack like slide projectors of old. The camera records the image digitally from whatever strong light source is used. This accessory is connected only by friction and is awkward to use without incurring undersirable camera wear and tear. Because it must be pointed in the direction of the sun to receive sunlight, the camera monitor screen is very difficult to observe against the bright sunlit background.

There is nothing on the market in the nature of a kit or system for solar slide copying to use on cameras from different manufacturers having differing camera mounting geometries. The current invention solves this problem simply and efficiently.

BRIEF SUMMARY OF THE INVENTION

This invention provides a tabletop workstation system that firmly mounts a camera to focus on a diffuse light-transmissive aperture, the size of a 35 mm slide, contained in one panel of a three-sided light diffuser chamber. This chamber receives light from the sun, or a bright halogen spot lamp, incident on the three white diffusely reflecting surfaces from either the left or right side of the workstation's axis. The light diffuser chamber comprises two hinged upright panels inserted into grooves in the base panel. The upright panels and the base panel redirect the incident light onto the aperture for a wide range of incoming light directions. Ideal slide aperture illuminance obtains from light directions varying from 40 degrees horizontally and 50 degrees vertically, permitting the camera to auto-focus and auto-expose at shutter speeds ranging from $\frac{1}{60}$ to $\frac{1}{250}$ second.

With the addition of a rectangular shroud having a front opening slightly larger than the size of the diffuser chamber, ambient light is suppressed, enabling the operator to comfortably view the camera's monitor to operate zoom function for the desired cropping. A pair of legs at the rear of the workstation tilts it forward so the slide to be photographed simply lies against the bright diffuser panel without need for any mounting fixture.

Bright sunlight incident upon a diffuse white surface provides an illuminance of about 6000 foot-Lamberts, too bright for the human eye to view comfortably, and much brighter than required for slide illumination. The three-sided diffuser chamber reduces the brightness provided to the slide by a factor of 3 or 4 from that of direct sunlight to achieve optimum brightness for camera operation.

This invention preferably provides a slotted rack for the workstation that is adaptable by means of shims and mounting bolts to accommodate different camera parameters: lens axis height above camera base; minimum macro focus distance; camera mounting distance from lens axis, left or right. With such flexibility, most of the digital cameras with macro zoom capability work well with this invention.

BRIEF DESCRIPTION OF THE DRAWINGS

In the drawings accompanying and forming part of this application.

DESCRIPTION OF CURRENTLY PREFERRED EMBODIMENTS

Figure 1:
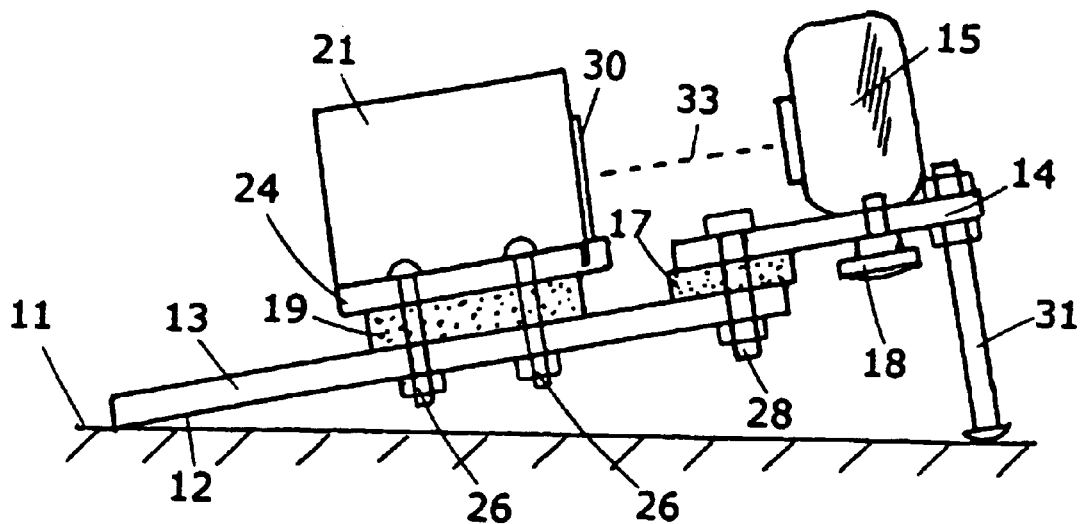
FIG. 1 is a side elevational view of one embodiment of the invention showing a small digital camera attached, with its lens aligned with the slide-illuminating means.
Figure 2:
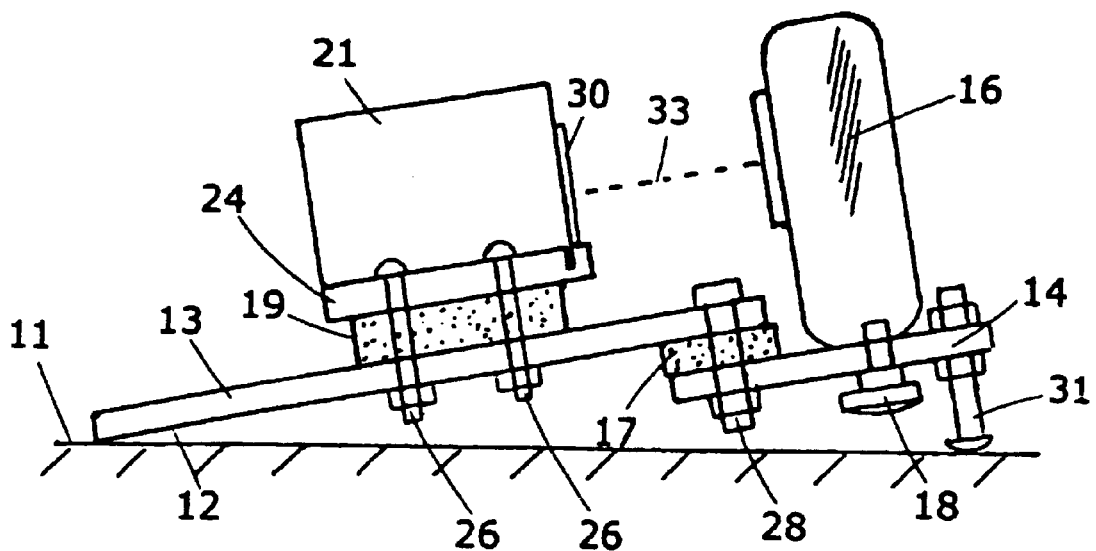
FIG. 2 is a side elevational view of another embodiment of the invention showing a larger digital camera attached with lens aligned with the slide-illuminating means.

FIG. 1 illustrates the invention fitted with a small digital camera 15 focused along lens axis 33 on the center of photographic slide 30. FIG. 2 illustrates the invention fitted with a large digital camera 16, focused along the lens axis 33 on slide 30. In both FIG. 1 and FIG. 2 workstation platform 12, having forward and rearward portions, is created by attaching diffuser rack 13 to camera rack 14 by means of mounting bolts 28. Diffuser rack 13 is thus positioned at the forward portion of platform 12 and camera rack 14 is positioned at the rearward position. A stack of one or more dual purpose shims 17 and 19 provides a range of spacings for racks 13 and 14 to align the lens axes for both large and small cameras with the center of slide 30. For most digital cameras the height of the lens axis above the camera base ranges from 0.8 inch to over 2.0 inches. Shims 17 and 19 having the profile shown in FIG. 5 are provided in thicknesses of 0.05 inch, 0.13 inch, 0.22 inch, and 0.50 inch.

Figure 5:
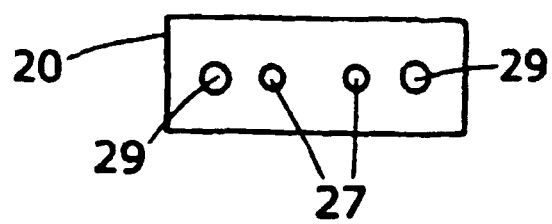
FIG. 5 is a plan view of dual purpose shims of varying thicknesses used to configure the workstation platform and to align the camera lens axis with the 35 mm slide to be photographed.

Shims 17 and 19, shown in FIG. 5, provide dual functions. Smaller interior holes 27 are used in bolting the grooved mounting base 24 for the diffuser chamber onto diffuser rack 13, with shims 20 interposed between. Outer holes 29 are used in bolting diffuser rack 13 to camera rack 14. Camera rack 14 may be positioned either above or below diffuser rack 13, to provide additional spacing options and permit matching camera lens axis 33 height to the center of slide 30.

The configuration of FIG.1 must be used when a 35 mm slide film camera is installed in the workstation to avoid interference between the camera lens and diffuser rack 13.

Figure 6:
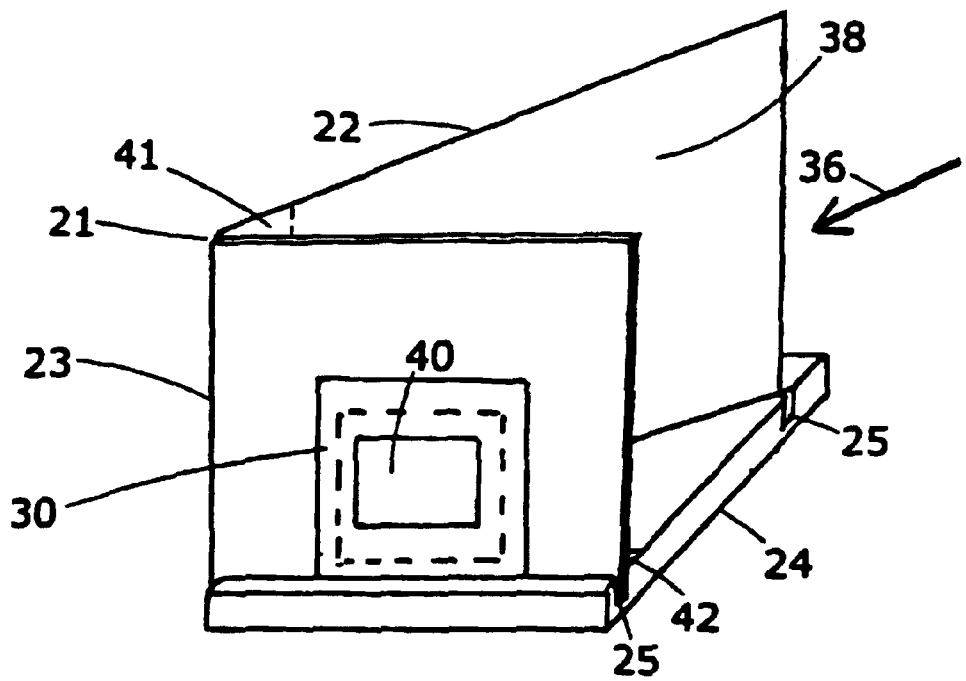
FIG. 6 is a perspective view of the slide illuminating means comprising a foldable panel mounted on the workstation platform, with slide in place.

Both FIG. 1 and FIG. 2 show cameras firmly mounted on camera rack 14 by means of camera mounting bolt 18 extending through slot 34. Both also show workstation-tilting legs 31 bolted to camera rack 14 to raise the rear edge of the workstation above table surface 11 so as to permit slide 30 to be placed on the forward lip of diffuser chamber base 24, leaning against transverse panel 23 as shown in FIG. 6. Mounting bolts 26 for base 24 of the diffuser chamber connect to diffuser rack 13 through longitudinal slot 35, shown in FIG. 3 and FIG. 4.

Figure 3:
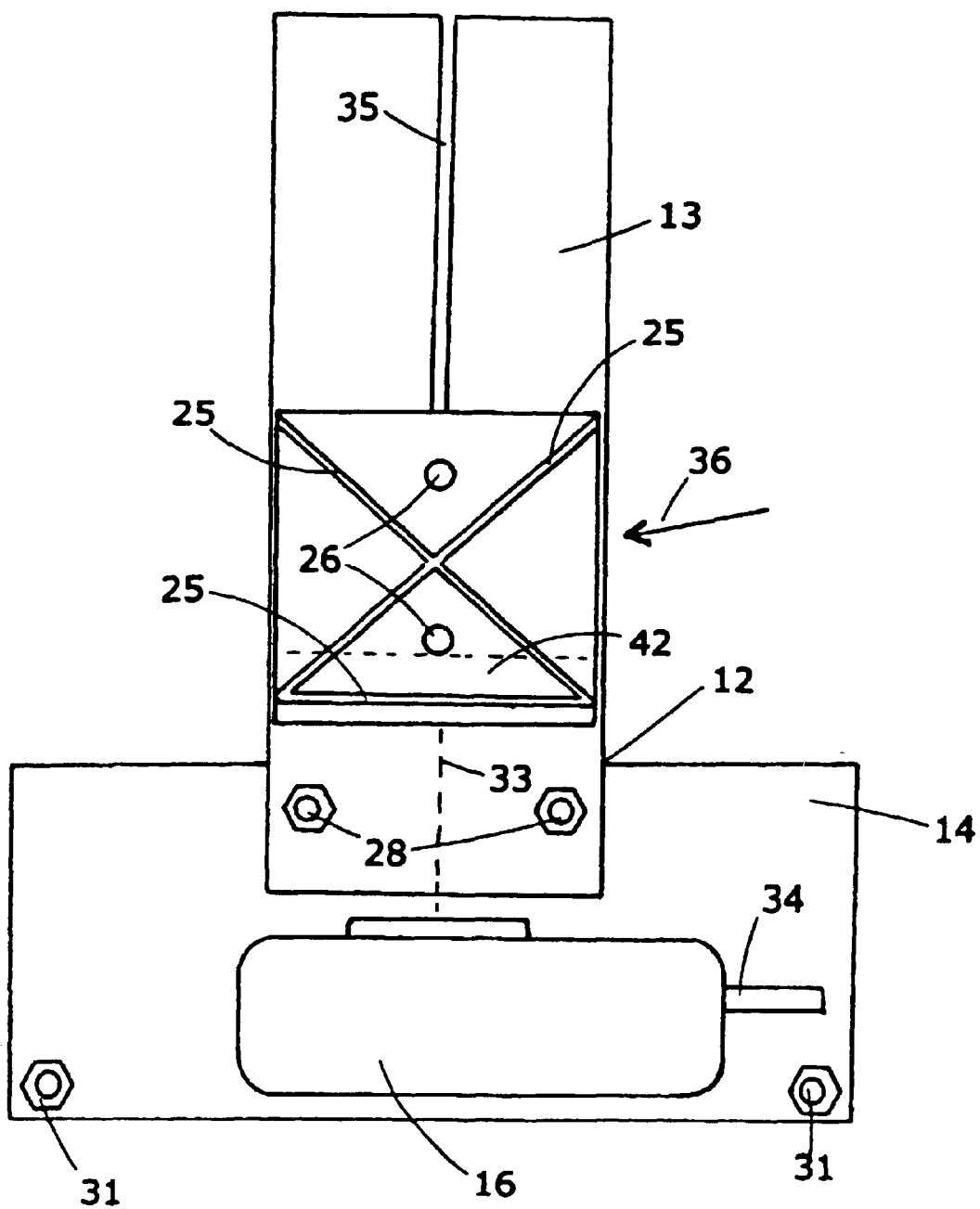
FIG. 3 is a plan view of the invention shown in FIG. 2.

FIG. 3 shows a plan view of the workstation of FIG. 2 with camera rack 14 fastened beneath diffuser rack 13 by camera rack bolts 28. Large camera 16 is shown firmly clamped on camera rack 14 through slot 34 aligned at right angles to camera lens axis 33. Cameras have tripod mounting holes in their bases either to the left or the right of lens axis 33. Left and right camera mounting holes can be served by attaching camera rack 14 with slot 34 directed to either the left or right of lens axis 33.

With this combination of slotted diffuser and camera racks and the dual purpose shims of differing thicknesses, only a minimum number of parts are needed to fit most of the popular digital cameras. Diffuser chamber bolts 26 are typically smaller 8–32 type; camera rack mounting bolts 28 and the workstation tilting legs are typically larger bolts of the ¼–20 type.

Figure 4:
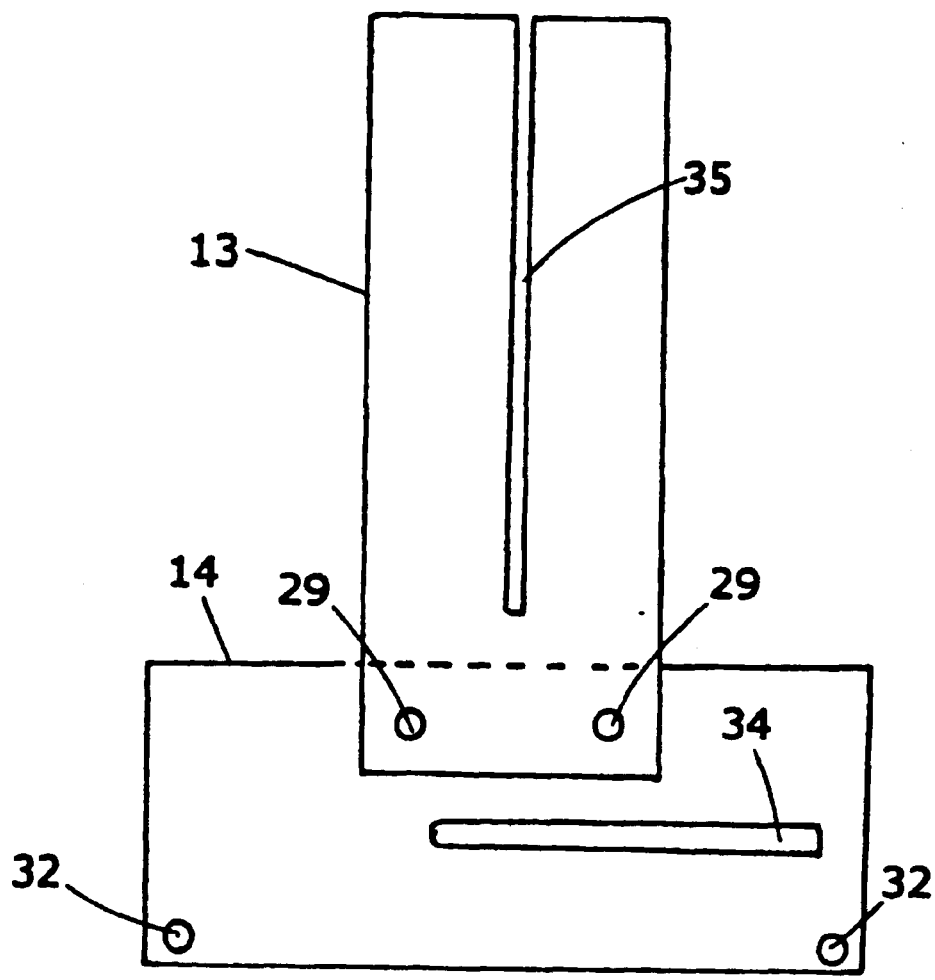
FIG. 4 is a plan view of the two racks that are connected to create the workstation platform.

FIG. 4 illustrates the length and position of slots 24 and 25 in diffuser rack 13 and camera rack 14. Camera bolting slot 34 is closed-ended to give camera rack rigidity to avoid flexure when the camera shutter is hand pressed. Open-ended center slot 35 In diffuser rack 13 is long enough to provide a wide range of camera lens to slide 30 spacing to obtain the minimum auto-focus distance required for many different cameras. Minimum auto-focus distance can vary from 2 cm to over 6 cm, and camera barrel lengths vary widely.

The horizontal components of workstation 12, racks 13 and 14, shims 17 and 19, and diffuser chamber base 24, can be made of custom sawn cabinetry grade plywood, injection-molded plastic, metal, or other suitable materials.

Figure 7:
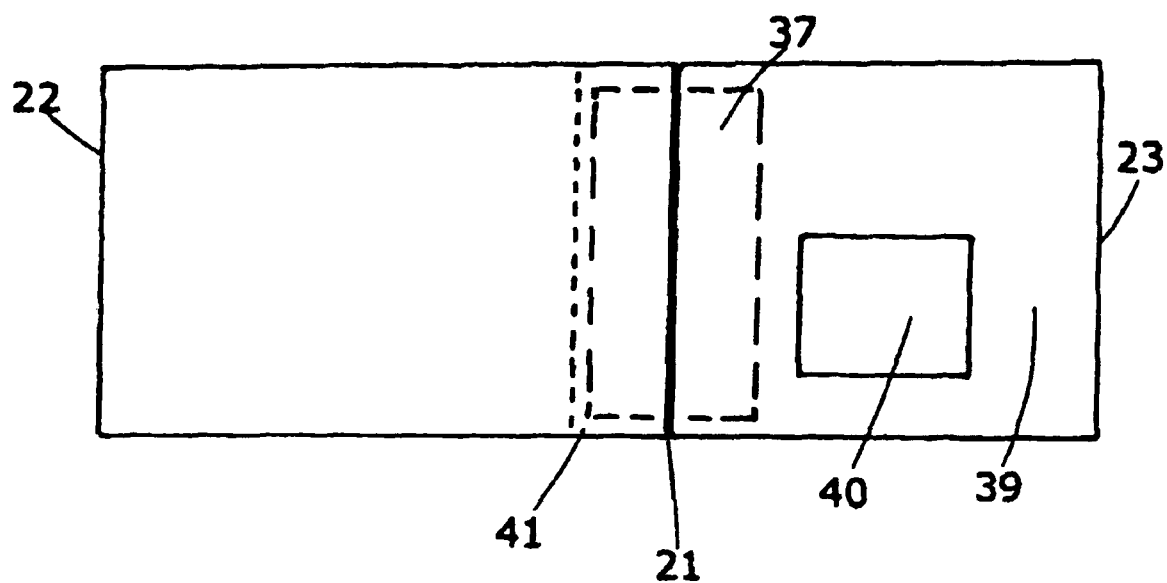
FIG. 7 is a plan view of the foldable panel of FIG. 6 in unfolded form, showing a long panel of opaque white light-reflecting material foldably attached to a relatively shorter light transmissive panel having an opaque mask screened thereon to outline an area approximately the size of a 35 mm slide.

FIG. 7 shows light diffuser-reflector assembly 21 folded to about 45 degrees and inserted into grooves 25 of the diffuser chamber base 24. This foldable assembly comprises two panels of 0.125-inch "Plexiglas" acrylic sheet which may have a height of 3.5 inches, panel 23 being 4.0 inches wide, and panel 22 being 5.5 inches wide. Panel 23, which fits into transverse groove 25 of base 24, may be made of "Plexiglas" 2447 having about 50 percent light transmission to serve as the slide-illuminating source for slide 30. Panel 23 is painted on the side facing the camera with light-absorbing flat black paint enclosing a central unpainted area 1.4 inch high×1.6 inch wide, larger than a 35 mm slide's image area and smaller than the 2 inch×2 inch slide frame.

The opposite side of panel 23, comprising the transverse member of the diffuser chamber, is painted with diffuse reflecting flat white paint with a concentric unpainted area 1.5 inches high×1.7 inches wide. These concentric light transmitting rectangles are centered 1 inch above the top surface of grooved mounting base 24 to form slide-illuminating aperture 40. Mounting base 24 may be 0.5 inch thick and grooves 25 are typically 0.32 inch deep and about 0.15 inch wide to receive panels 22 and 23.

Diffuser-reflector panel 22 fits into diagonal groove 25, positioned about 45 degrees to the right of the camera's view direction to receive skylight from the right side of the workstation as shown by arrow 36 in FIG. 6. Panel 22 has a 1.0 inch wide strip of flat black paint 41 along its hinged edge. Hinge 37 connecting panels 22 and 23 may be a strip of black duct fabric tape applied to outer surfaces of the panels. Referring back to FIG. 3, the grooved mounting base is likewise painted diffuse reflecting white with an 0.8 inch wide strip 42 of flat black paint along the transverse edge facing the camera. Black paint strip 42 covers the lip of base 24 on which slide 30 stands, the transverse groove, and about 0.5 inch of the adjacent base 24. Black strips 41 and 42 reduce the bright edge lighting of the slide aperture nearest reflecting surfaces 22 and 24 to obtain good uniformity of brightness throughout aperture 40.

The folding light diffuser-reflector chamber assembly comprising sides 22, 23, and 24 shown in FIG. 6 forms a three-sided chamber that receives an incoming beam of skylight directly from the sun or from cloud-scattered light. This skylight illuminance is diffusely reflected back and forth between these three walls to redirect some 20 percent or so of the incoming light energy into the diffusely transmissive slide-illuminating aperture 40. If all three internal surfaces of this chamber were completely white without the black strips 41 and 42, a brightness variation of about 20 percent would exist in the slide aperture. 20 percent variation would not be very noticeable in the digitally recorded slide image; however, this variation is reduced to about 10 percent with the addition of stripes 41 and 42.

Such performance is obtained from 3.5-inch high folding panels where the width of the transverse panel 23, is approximately 4 inches and the width of the diagonal panel 22, is approximately 5.5 inches. The angle between them is about 45 degrees, although this angle is not critical. A smaller angle would reduce the horizonal range of sunlight incidence. Increasing the angle reduces brightness uniformity somewhat. Smaller panels would increase the brightness variation within the slide-illuminating aperture 28, beyond 10%. Larger panels would produce about the same performance but would make the system both bulkier and costlier.

FIG. 3 shows diffuser chamber base 24 having three grooves 25. One groove is transverse to lens axis 33; two are crossed, about 45 degrees to lens axis 33. FIG. 6 shows the diffuser chamber assembly configured to receive sunlight from the right side of the workstation. Should the user prefer to receive sunlight from the left side of the workstation, the folding panel 21 can be retaped, reversing panel 22 to attach to the right edge of panel 23 to keep black paint strip 41 at the hinge line.

While the invention as described above will provide excellent slide copying, there is one additional component that will make the work station much more user friendly. The monitoring window on the back of most digital cameras is operated at low brightness levels to conserve battery power. Such monitors are very difficult to see when the eye must view bright sun drenched objects in the background, near or far. Component 43 is simply a shroud, or darkened enclosure, blocking ambient light from space between the illuminated slide's plane and a plane roughly an inch or so behind the camera.

Figure 8:
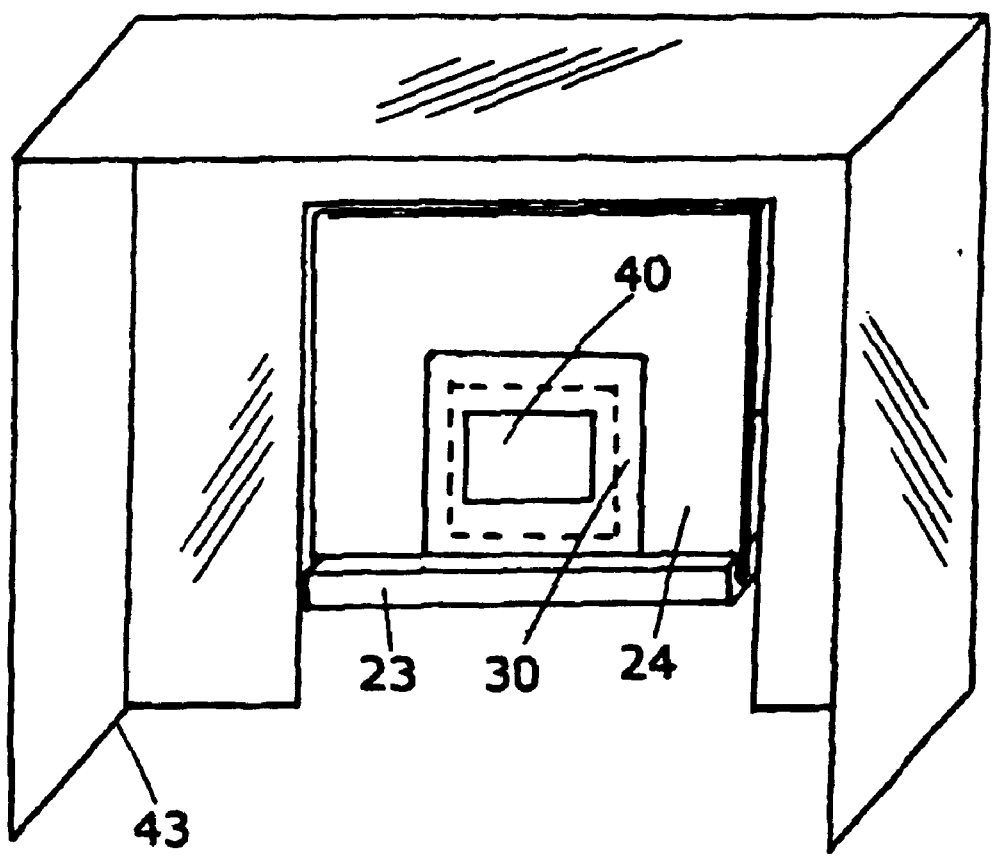
FIG. 8 is a perspective view of a shroud surrounding the 35 mm slide viewing surface, with the camera and rack removed for clarity.

FIG. 8 illustrates a shroud which could be made from a 10-inch cube cardboard packing box cut down to approximately half size. Such a size provides adequate room for the operator to reach around the camera to easily adjust the slide's position for image cropping purposes and operate the camera controls. Camera 16 and rack 14 have been removed from the figure to enhance clarity and understanding. Shroud 43, which has a front, two sides and a top, stands alone on work table 11. The front face of shroud 43 is cut out to fit closely, but not be in contact, with transverse slide illuminator panel 23, and to fit around the width of the rack, not shown. Such an enclosure substantially eliminates the glare problem from ambient reflected sunlight. Internal surfaces of shroud 43 are painted flat black to absorb ambient light.

The workstation is best used on a table near a sun-facing window at least an hour after sunrise and an hour before sunset, thus avoiding the atmospheric scattering of bluer light. As the sun's height above the horizon increases, the brightness of slide aperture 40 decreases. As the workstation is rotated toward the sun, the slide brightness increases as transverse panel 23 containing the slide aperture 40 receives more direct sunlight. In all the above cases the brightness variation within the slide aperture remains at 10 percent or less so long as all three internal surfaces of the diffuser chamber remain free of shadows.

The workstation delivers a slide aperture output brightness of from 600 to 2400 foot-Lamberts, enabling cameras set at ASA 80–100 equivalent to expose at shutter speeds of $1/60$ to $1/250$ second. Good results can be obtained at lower light levels requiring longer exposure times if care is taken to avoid movement between slide and camera.

Where specific materials and dimensions have been used in describing currently preferred embodiments of the invention, it will be understood that there is no intention to be limited thereby. Accordingly the scope of the invention is defined only by the appended claims, giving full recognition to the doctrine of equivalents.

What is claimed is:

1. A device for aligning the lens axis of a camera with a backlighted photographic slide to permit copying, comprising in combination a platform having forward and rearward portions, supporting at the forward portion a diffuser chamber that comprises;
    (a) a slide-illuminating panel extending upwardly from and transversely across said platform, said slide-illuminating panel having a central aperture corresponding to the dimensions of a photographic slide,
    (b) a diffuse reflector panel extending upwardly from and diagonally across said platform, one end of said reflector panel being connected to one end of said slide-illuminating panel, and
    (c) the upper surface of the forward portion of said platform, the rearward portion of said platform being provided with means for mounting a digital camera at laterally and vertically adjustable positions, so as to permit alignment of the camera lens with the center of said aperture, said rearward portion being provided with tilting means to elevate it, whereby a photographic slide placed over the aperture is held in place by gravity.

2. The invention of claim 1 wherein the upper surface of the forward portion of the platform is provided with grooves into which the panels fit.

3. The invention of claim 1 wherein the sides of the two panels and the surface of the platform that together define the light diffuser chamber are provided with diffuse white surfaces.

4. The invention of claim 3 wherein the two panels are connected by a tape hinge.

5. The invention of claim 4 wherein the diffuser chamber has a reflectively flat black stripe on the portion of the diagonal reflector panel that is adjacent to the tape hinge and another reflectively flat black stripe on the surface of the platform adjacent to the slide-illuminating panel.

6. The invention of claim 1 wherein the forward portion of the platform comprises a rack for supporting the diffuser chamber and the rearward portion of the platform comprises a camera rack for supporting a camera, said racks being connected together.

7. The invention of claim 6, wherein the diffuser chamber rack and the camera rack are vertically displaced with respect to each other.

8. The invention of claim 7 wherein the two racks are overlapped and bolted together.

9. The invention of claim 7 wherein the camera rack is positioned above the diffuser rack.

10. The invention of claim 7 wherein the camera rack is positioned below the diffuser chamber rack.

11. The invention of claim 7 wherein at least one spacer shim is interposed between the two racks to increase the amount of displacement.

12. The invention of claim 7 wherein at least one spacer shim is interposed between the platform and the diffuser chamber rack to decrease the amount of displacement.

13. A method of copying a photographic transparency, comprising the steps of;
    a. providing a platform on which is mounted a 3-sided diffusion chamber open at the top and one side, said chamber comprising a transverse panel, a diagonal panel, and a base, said transverse panel having an aperture corresponding to the dimensions of said transparency and tilted so that a transparency placed thereagainst would be held in place by gravity,
    b. placing a photographic transparency over said aperture,
    c. mounting on said platform camera having a monitor display, so that the lens axis projects through the transverse panel,
    d. aligning the lens axis of the camera with the aperture,
    e. introducing a source of illumination to the chamber so as to backlight the transparency, and
    f. opening the lens of the camera for a length of time sufficient to transfer the image on the transparency of the camera.

14. The method of claim 13 wherein the source of illumination is sunlight.

15. The method of claim 13 wherein a shroud is mounted over the camera and the transverse panel to block ambient light from the camera monitor display.

\* \* \* \* \*